Figure 1:
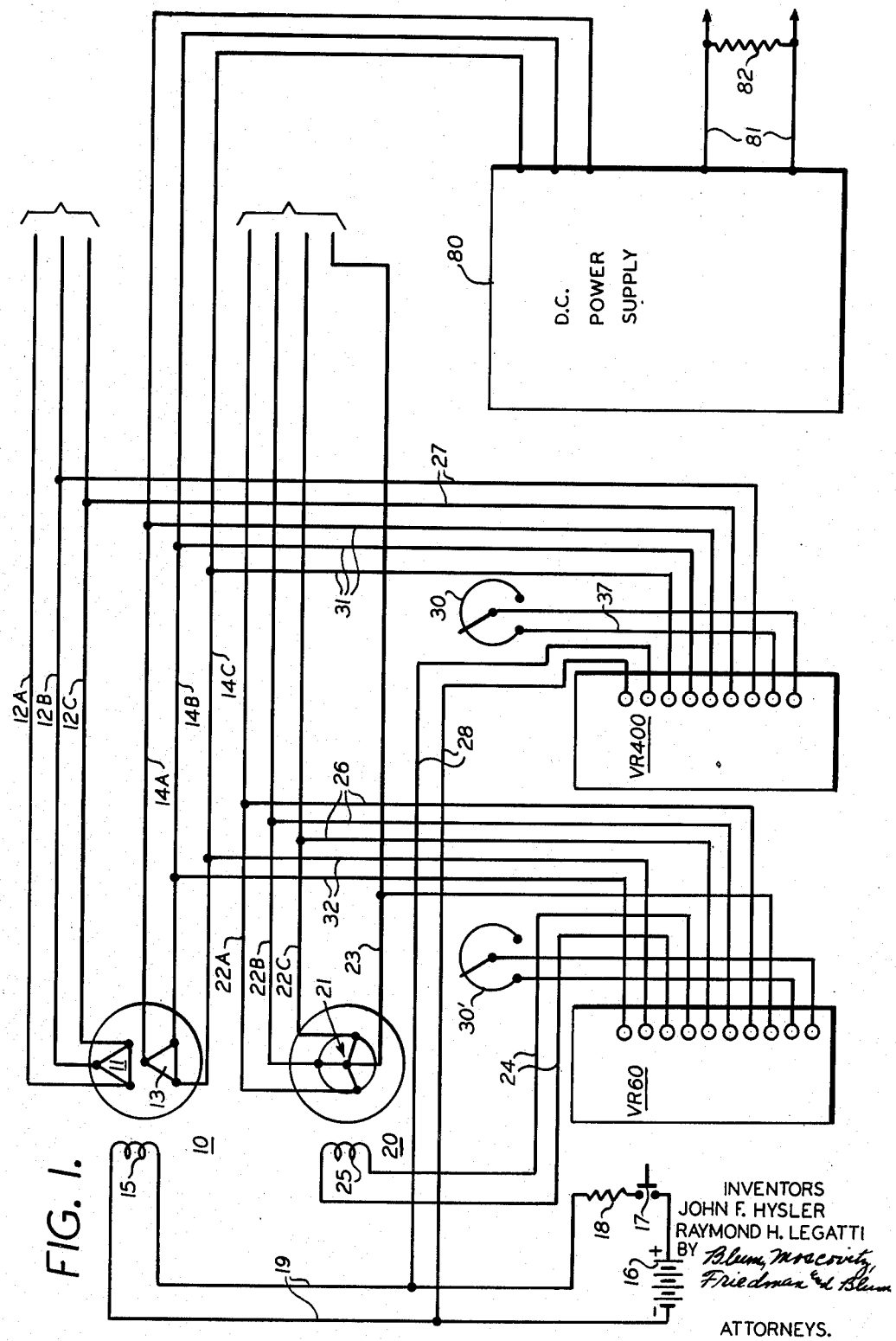

INVENTORS
JOHN F. HYSLER
RAYMOND H. LEGATTI

ATTORNEYS.

3,257,605
GENERATOR VOLTAGE CONTROL SYSTEM
John F. Hysler, Sayville, and Raymond H. Legatti, Bellport, N.Y., assignors to Electromagnetic Industries, Inc., Sayville, N.Y., a corporation of New York
Filed June 7, 1962, Ser. No. 200,741
8 Claims. (Cl. 322—28)

This invention relates to generator voltage regulators and, more particularly, to an improved and simplified voltage regulator arrangement controlling the field excitation derived from the generator armature by a phase control arrangement utilizing solid state rectifiers modulating current flow in a closed loop connecting the armature output to the field input.

An object of this invention is to provide an improved voltage regulator for A.C. generators which may be used with any commercial or power frequency to maintain a very close control of the output voltage of the generator.

A further object of the invention is to provide such a regulator in which the regulating action is effected as a modulation of field excitation, deriving its energy from the armature of the generator, thus forming, in effect, a closed loop system.

Another object of the invention is to provide a regulator of this type in which regulation of the voltage, by modulation of the field excitation current, is effected by a novel combination of preamplifiers and solid state controlled rectifiers.

A further object of the invention is to provide such a regulator in which the solid state controlled rectifiers are silicon controlled rectifiers. As the art term for silicon controlled rectifiers is "SCR," this expression "SCR" will hereinafter be used to designate "silicon controlled rectifiers."

In accordance with the present invention, an A.C. generator field winding receives excitation from the armature output of the generator, and one or more solid state controlled rectifiers, such as silicon controlled rectifiers, known as "SCR's," are included in a closed loop connecting the armature to the field winding. The SCR's are normally non-conductive in either direction, but become conductive when triggered by a gating pulse provided thereto. This pulse may be applied to the SCR's at any point during a half cycle of A.C. current flow, and thus control the portion of such half cycle during which current will be delivered to the field winding.

An output voltage, corresponding to the armature output voltage of the generator, is applied to a full wave rectifier, and the resultant D.C. component of the output voltage is applied to a non-linear bridge, which may be called a detector. The bridge includes, as one of its elements, a means, such as a zener diode, which provides a fixed reference voltage. Any differential between the fixed reference voltage and the rectified D.C. output voltage component is fed as a control signal current through the control coils of a magnetic amplifier.

The magnetic amplifier derives its power from the voltage drop across the SCR in the latter's non-conducting state. This voltage drop appears as a pulse, because as soon as the SCR conducts, the voltage drop thereacross disappears. The magnetic amplifier thus provides a gating current or signal for the SCR, and the phase relation of this gating signal to the anode voltage applied to the SCR is controlled in accordance with the relative sign and value of the differential control signal. Correspondingly, the SCR is thereby gated or triggered at a point in the half cycle depending on the sign and value of the differential control signal.

Due to the fact that the magnetic amplifier derives its power from the voltage drop across the SCR in its non-conducting state, the gating pulse disappears as soon as the SCR becomes conductive to supply current to the field winding during a predetermined portion of the cycle. There is thus no gate current while the field excitation current is flowing through the SCR. The number of silicon controlled rectifiers, as well as the number of magnetic amplifiers, is determined by whether or not the A.C. generator is a single phase or a polyphase generator. For example, in the case of a three-phase A.C. generator, there could be three silicon controlled rectifiers each gated by a magnetic amplifier associated therewith.

As an ancillary feature of the invention, a feed-back control signal may be applied to an auxiliary control winding of each magnetic amplifier and thereby the gain of the magnetic amplifier may be modulated either by negative feed-back or by positive feed-back, dependent upon the particular result desired. As the load is inductive, it may be necessary to use a discharge diode connected across the field, to permit full control of the silicon controlled rectifiers.

Figure 2:
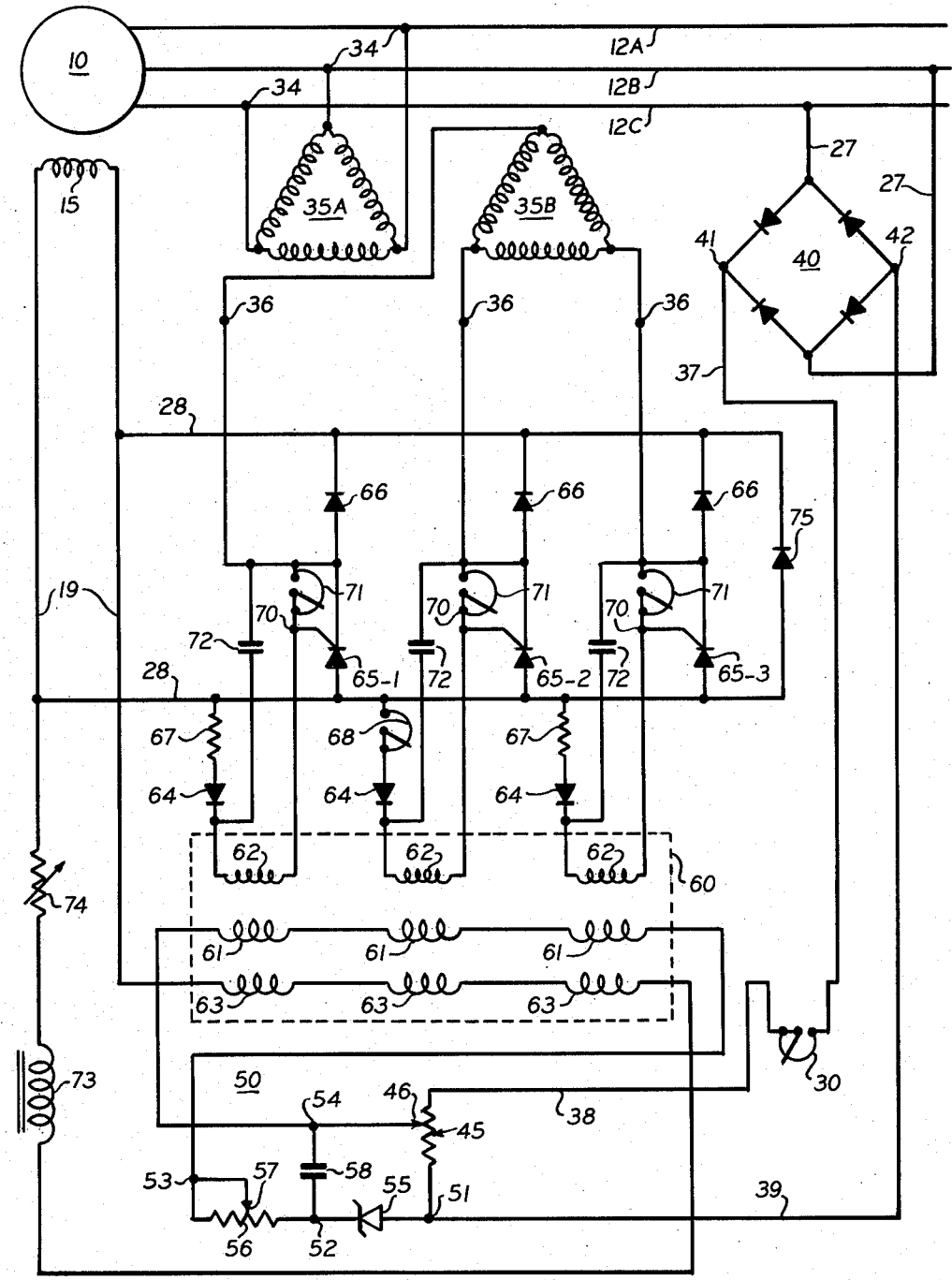

For an understanding of the principles of the invention, reference is made to the following description of a typical embodiment thereof as illustrated in the accompanying drawings. In the drawings:

FIG. 1 is a schematic wiring diagram of a known type of universal power supply having the invention voltage regulator and field excitation control circuit applied thereto; and FIG. 2 is a schematic wiring diagram of the invention voltage regulator and field excitation control circuit.

Referring to FIG. 1 of the drawing, a known type of universal power supply is illustrated as including a 400 cycle generator 10 and a 60 cycle generator 20. Both generators are driven by a common prime mover (not shown), such as a diesel engine. In the illustrated example, generator 10 has a field winding 15 and generator 20 has a field winding 25. Generator 10 has a 120-volt, delta-connected armature winding 11 delivering power to three mains 12A, 12B and 12C, and a 30-volt delta-connected winding 13 delivering power to three mains 14A, 14B and 14C. Generator 20 has a 120/208-volt Y-connected winding 21 delivering power to three mains 22A, 22B and 22C, and including a grounded neutral connected to a ground main 23. The initial, or start-up, excitation for field winding 15 is provided by a battery 16 connected, in series with winding 15, through a switch 17 and a field resistance 18. However, except for the initial excitation provided by the battery 16, the excitation of the field windings 15, and 25 is provided from the generator armature winding 13.

The armature windings 11 and 21 provide the control circuit potential. In the known type of power supply selected for illustration in FIG. 1, the 30-volt winding 13 also provides a regulated direct current output, as will be described.

For modulating the respective field excitations, voltage regulators embodying the invention are interposed in the field excitation circuits of generators 10 and 20. As illustrated, a voltage regulator VR 400 is connected by leads 27 to mains 12B and 12C, and by field supply leads 28 to the excitation circuit 19 of field winding 15. Further, a voltage regulator VR 60 is connected by leads 26 to the mains 22A, 22B and 22C, and to the excitation circuit 24 for the field winding 25. Leads 31 supply the 30-volt potential to voltage regulator VR 400, and leads 32 supply the 30-volt potential to voltage regulator VR 60. Voltage control rheostats 30 and 30' are associated with the regulators VR 400 and VR 60, respectively.

It should be noted at this point, that, while the arrangement illustrated in FIG. 1 indicates that the 30-volt output of generator 10 is used to provide the field excitation potentials, these potentials may be provided otherwise as by armature windings 11 and 21.

As indicated at the lower right-hand corner of FIG. 1, the winding 13, in the particular power supply illustrated, supplies the input potential to a D.C. power supply indicated at 80, the D.C. output potential being supplied to mains 81 across which is connected a suitable resistor 82. As the details of the D.C. power supply 80 are old and well known, it has been schematically illustrated merely in block form.

The regulator VR 400 is shown in greater detail in FIG. 2. In FIG. 2, the 30-volt generator output may be applied to the terminals 34, as by conductors 31 of FIG. 1. However, and to illustrate a more general case, the 30-volt supply is illustrated as provided by a step-down transformer including a delta-connected primary winding 35A, connected to mains 12A, 12B and 12C, and a delta-connected secondary winding 35B connected to terminals 36. This illustrates how the invention may be used with any voltage power supply with the provision of proper step-down transformers, and is not limited to an arrangement wherein the control circuit voltage and field excitation potential is provided from a 30-volt armature winding.

Conductors 27, connected to mains 12B and 12C of armature winding 11 of generator 10, are connected to the input terminals of a full-wave rectifier 40. A conductor 37 connects the positive output terminal 41 of rectifier 40 to one terminal of control rheostat 30. A conductor 38 connects the other terminal of rheostat 30 to one end of a voltage divider or variable resistor 45, whose other end is connected by a conductor 39 to the negative output terminal 42 of bridge 40. Due to the full-wave rectifier 40, a unidirectional potential, having a value corresponding to the A.C. voltage across mains 12B and 12C, is applied across variable resistor 45, and its value may be adjusted by means of voltage control rheostat 30.

Variable resistor 45 is part of a non-linear bridge 50. The connection of one terminal of variable resistor 45 to the conductor 39 is made at a junction point 51 of bridge 50. The other arms of bridge 50 include a zener diode 55 and a variable resistor 56 interconnected at a junction point 52. The fourth arm of the bridge comprises the series-connected control coils 61 of a magnetic amplifier 60, these control coils being connected in series with variable resistor 56 between junction points 52 and 54, with the adjustable tap 46 of voltage divider 45 being connected to point 54. Variable resistor 56 has an adjustable tap connected to the junction point 53, and a filter condenser 58 is connected between junction points 52 and 54.

The non-linear bridge 50 is really a half bridge which provides a differential signal for controlling the magnetic amplifier 60. Insofar as the three control coils 61 in series are concerned, only one of these coils at a time will be in phase with the A.C. input signal to the full-wave rectifier 40 from which the bridge input signal is derived. It is for this reason that the filter condenser 58 is included, and such a condenser may not be necessary in a single phase system to which the regulator is applied.

There is a fixed voltage across the zener diode 55, as such a zener diode has a certain fixed voltage rating or will "absorb" a certain number of volts. This fixed voltage across the zener diode is the comparison or reference voltage for the bridge, and this reference voltage remains constant. The purpose of the variable resistor 56 is to vary the value of the current flowing through the control coils 61 of the magnetic amplifier 60, by interposing an adjustable voltage drop in the series circuit including these coils. However, it should be noted that the variable resistor 56 has no adjusting effect upon the fixed reference voltage of the bridge 50.

The input signal to bridge 50 is applied across variable resistor 45, and a certain proportion of this input signal is applied, in opposition to the reference voltage controlled by zener diode 55, by adjustment of tap 46 of variable resistor 45. Thus, the voltage applied in opposition to the reference voltage is proportional to the rectified D.C. potential derived from full-wave bridge 40 connected across mains 12B and 12C. Any voltage difference between the input voltage and the reference voltage controlled by zener diode 55, will result in a current flow through control coils 61 proportional to such difference. The value of the control signal is determined by proper adjustment of tap 46 of variable resistor 45. The current through control coils 61 controls the flow of current through the power coils 62 of magnetic amplifier 60 and, in turn, this controls the point at which, during each half cycle, a gating current pulse is supplied to the silicon controlled rectifiers.

The SCR's 65–1, 65–2 and 65–3 form, together with their associated diodes 66, a full-wave three-phase bridge which is a control bridge connected to the field winding of generator 10 and controlling the excitation of this field winding. The connection is made through the conductors 28 connected to the winding 15.

Each of the power coils 62 of magnetic amplifier 60 is connected across a respective SCR 65 in series with a diode 64 and a resistance. The resistance for two of the power coils 62 comprises a fixed resistance 67, while that for the third power coil 62 comprises a potentiometer 68. In each case, the resistance 67 or the terminal of potentiometer 68 is connected to one conductor 28, and the other terminal of each resistor 67 or of the potentiometer 68 is connected to the anode of the associated diode 64, whereby each diode 64 assures unidirectional current flow through its associated power coil 61. The opposite end of each power coil is connected to a junction point 70 which may be termed the "gating junction point," these gating junction points being connected to the gates of the respective SCR's 65. A potentiometer 71 connects each gating junction point 70 to the junction of the associated SCR 65 and series diode 66.

A capacitor 72 is connected between the junction point of each power coil 62 and its associated diode 64 and a terminal 36 of the secondary winding 35B. Magnetic amplifier 60 has a second set of control coils 63, connected in series with each other, which are used to provide, when desired, a feed-back signal to the magnetic amplifier. These coils are further connected in series with an inductor 73 and a variable resistance 74. Inductor 73 controls and reduces the amount of noise in the feed-back circuit, and variable resistance 74 controls the value of the fedd-back. Resistors 67, 67 and potentiometer 68 act as limiting resistors for controlling the value of the control signal, and the three diodes 64 maintain the current of one polarity in the control circuit. These also make magnetic amplifier 60 self-saturating rather than nonself-saturating.

It will be noted that each power coil 62 is connected across its associated SCR 65 and thus has impressed thereacross the potential drop across the associated SCR in the non-conducting state of the latter. However, each time a power coil 62 conducts current, it triggers or gates the associated SCR 65 through respective gating junction point 70, and the SCR then becomes fully conductive. Consequently, there is essentially no voltage drop across the associated SCR, and thus essentially no flow of gating current, except during the instant required to trigger or gate the SCR.

In the operation of the system, the output voltage of the generator armature, a portion of which is applied to full-wave rectifier 40, provides a D.C. control signal or D.C. voltage which is proportional to the output voltage of the armature and whose value, as applied to non-linear bridge 50, is determined by potentiometer 30. In the non-linear bridge, each half wave of rectified current is compared with the fixed reference voltage controlled by zener diode 55. Any difference between the relatively constant reference voltage and the input voltage applied from rectifier 40 through potentiometer 30, produces a different control signal current which is proportional to the value of such differential in voltage.

The value of the control voltage, which is the output of the bridge 50, determines the percentage or portion of each cycle during which current flows through the power coils 62 of the magnetic amplifier. In turn, this control voltage is dependent upon the output voltage of the generator. Specifically, the control voltage regulates the current flow through the control coils 61 of the magnetic amplifier and, in turn, the current flow through the control coils 61 regulates the portion of the cycle during which the power coils 62 conduct current.

The adjustments are initially set so that, with the generator operating at its rated armature output voltage, the field excitation is applied over a portion of each cycle sufficient to insure that the field current will be of a value to provide the rated output voltage. Should the output voltage of the armature increase, the resulting control voltage will decrease the percentage of each cycle during which current will flow to the field circuit. Conversely, if the generator armature voltage decreases, the control voltage will effect an increase in the percentage of time of each cycle during which current flows through the field winding 15 to thereby increase the generator output voltage.

As mentioned, there is a feed-back circuit to the magnetic amplifier, the feed-back signal being applied to control coils 63. If the gain is exactly right, there is no need for any feed-back. On the other hand, if the gain is too small, a positive feed-back is required, and if the gain is too large, a negative feed-back is required. While positive feed-back makes the system operate more perfectly, if there is too much gain, instability of the system may result and negative feed-back may be required to restore stability to the system. It is also possible to vary or rate the feed-back to obtain stability, and this is usually effected by feeding the signal back through a condenser-resistance network which provides a differential pulse. It is also possible to use lead-lag networks in the feed-back to achieve stability. As already mentioned, the the feed-back circuit of the present invention includes an inductor 73 and a variable resistance 74 connected in series with feed-back control coils 63. Inductor 73 controls or reduces the amount of noise in the feed-back circuit, and variable resistance 74 controls the value of the feed-back.

As the load is inductive, it is usually necessary to use discharge valve or diode 75 connected across conductors 28. Otherwise, spurious signals would be injected into the SCR's, causing a malfunction.

While a specific embodiment of the invention has been shown and described in detail to illustrate the application of the principles of the invention, it will be understood that the invention may be embodied otherwise without departing from such principles.

What is claimed is:

1. In an A.C. generator system, an output voltage regulation circuit comprising in combination, a field winding having a pair of input terminals; a gate controlled rectifier having anode, cathode and gate electrodes, said anode being connected to one of said field winding terminals; a diode interconnecting the other of said field winding terminals and said cathode; means for applying an A.C. voltage substantially in phase with the armature voltage of said A.C. generator, said A.C. voltage application means being connected between the anode and cathode of said gate controlled rectifier; magnetic amplifier means for providing gating pulses for said gate controlled rectifier, said magnetic amplifier means comprising a control winding and also comprising an output power winding connected between said anode and gate electrodes whereby the potential developed across said cathode to anode terminals of said gate controlled rectifier is applied across said power winding when said gate controlled rectifier is in the non-conducting state; means for providing a substantially constant unidirectional reference potential; means for deriving a unidirectional differential signal proportional to the difference between said armature voltage and said reference potential; means connected to said control winding applying said differential signal thereto, said power winding being connected between said anode and gate electrodes to thereby supply gating pulses to said gate controlled rectifier and thereby render said gate controlled rectifier conductive at a selectively variable point in each half cycle of armature voltage to thereby continuously vary said field excitation in accordance with said armature voltage.

2. A voltage regulator circuit as defined in claim 1 wherein said magnetic amplifier means includes a second control winding responsive to the application thereto of a feedback control signal to thereby selectively vary the output of said magnetic amplifier means.

3. A voltage regulator circuit as defined in claim 2 including a field excitation feedback control circuit comprising feedback signal control means, said feedback signal control means and said second control winding being serially connected with said field winding.

4. A voltage regulator circuit as defined in claim 3 wherein said feedback control circuit comprises a variable resistor and an inductor in serial arrangement, said variable resistor being operative to selectively vary the feedback signal and said inductor operative to reduce the noise in said field excitation feedback control circuit.

5. An output voltage regulator circuit as defined in claim 1 wherein said differential signal deriving means comprises a full wave rectifier circuit connected across the armature output; a detector bridge comprising a zener diode connected in one arm of said bridge, a variable resistor connected in a second arm of said bridge, a reference voltage source connected in a third arm of said bridge, and a potentiometer connected in the fourth arm of said bridge; the output of said full wave rectifier being connected to said potentiometer, said potentiometer operative to apply a preselected portion of the output from said full wave rectifier circuit to said detector bridge and said control winding being connected across the output of said detector bridge.

6. In a polyphase A.C. generator system, an output voltage regulation circuit comprising in combination, a field winding having a pair of input terminals, a plurality of gate controlled rectifiers equal in number to the number of phases of said polyphase generator system, each of said gate controlled rectifiers having anode, cathode and gate electrodes, each of said anodes being connected to one of said field winding input terminals; a plurality of diodes equal in number to said number of gate controlled rectifiers, each of said diodes interconnecting the other of said field winding input terminals and said cathodes, the circuit configuration of said gate controlled rectifiers and associated diodes constituting a full-wave bridge; means for applying an A.C. voltage substantially in phase with the armature voltage of said A.C. generator, said A.C. voltage application means being connected between the anode and cathode of each of said gate controlled rectifiers respectively; magnetic amplifier means for providing gating pulses for each of said gate controlled rectifiers, said magnetic amplifier means comprising a number of control windings and a number of output power windings both equal to said number of phases, said output power windings being respectively connected between each of said corresponding anode and gate electrodes whereby the potential developed across respective cathode to anode terminals of said gate controlled rectifiers is applied across corresponding power windings when said gate controlled rectifiers are respectively in the nonconducting state; means for providing a substantially constant unidirectional reference potential; means for deriving a unidirectional differential signal proportional to the difference between said armature voltage and said reference potential; means connected to each of said control windings for applying said differential signal thereto, each of said power windings being operative to supply gating pulses to said gate controlled rectifiers and thereby render said gate controlled rectifiers conductive at a selectively variable point in each half cycle of armature voltage to thereby continuously vary said field excitation in accordance with said armature voltage.

7. A voltage regulator circuit as defined in claim 6 including a number of adjustable resistors equal to said number of phases, each of said adjustable resistors connected between its associated gate and cathode electrodes, said adjustable resistors operative to compensate for dissimilarities in operating characteristics between said gate controlled rectifiers.

8. A voltage regulator circuit as defined in claim 7 including a number of resistor-diode series combinations equal to said number of phases, each of said combinations interconnecting its associated power winding and said one field winding input terminal, the diode of each of said combinations operative to polarize the current flow in said associated power winding and the resistor of each of said combinations providing for balancing of the magnitude of said gating pulses being sequentially applied to said gate controlled rectifiers, with at least one of said last named resistors being adjustable.

References Cited by the Examiner
UNITED STATES PATENTS 3,032,700   5/1962   Cecil et al. _____ 322—25

OTHER REFERENCES

Electrical Design News, June 1959, pp. 20–21.

G. E. Controlled Rectifier Manual, 1st edition, March 21, 1960, p. 49.

LLOYD McCOLLUM, *Primary Examiner.*

MILTON O. HIRSHFIELD, A. H. TISCHER, R. C. SIMS, *Assistant Examiners.*